ered Patent [19]

United States Patent [19]

Underhill

[11] Patent Number: 4,514,968
[45] Date of Patent: May 7, 1985

[54] IN-LINE RECTANGULAR BALER

[75] Inventor: Kenneth R. Underhill, Strasburg, Pa.

[73] Assignee: Sperry Corporation, New Holland, Pa.

[21] Appl. No.: 439,000

[22] Filed: Nov. 4, 1982

[51] Int. Cl.³ .............................................. A01P 61/00
[52] U.S. Cl. ................................ 56/341; 100/188 R; 100/189
[58] Field of Search ................ 56/341, 342, 343, 364; 100/179, 188 R, 189

[56] References Cited

U.S. PATENT DOCUMENTS

| | | | |
|---|---|---|---|
| 1,496,363 | 6/1924 | Bonnafoux | 56/341 |
| 1,808,425 | 6/1931 | Markt | 56/341 |
| 2,552,888 | 5/1951 | Druetta | 56/341 |
| 2,608,929 | 9/1952 | Paradise et al. | 100/189 |
| 2,775,339 | 12/1956 | Cadies | 56/341 |
| 2,909,887 | 10/1959 | Claas | 56/341 |
| 3,464,347 | 9/1969 | Morris | 56/341 |
| 3,570,395 | 3/1971 | Eberly | 56/341 |
| 4,135,444 | 1/1979 | White et al. | 56/341 |
| 4,184,312 | 1/1980 | Oosterling et al. | 56/341 |
| 4,372,104 | 2/1983 | Simonis et al. | 56/341 |
| 4,375,786 | 3/1985 | Oosterling et al. | 56/341 |

Primary Examiner—Gene Mancene
Assistant Examiner—John G. Weiss
Attorney, Agent, or Firm—Darrell F. Marquette; Frank A. Seemar; Larry W. Miller

[57] ABSTRACT

A baler has a bale case disposed above and centrally of a pickup mechanism. A feed mechanism is provided to deliver crop material from a feed area into the bale case through an opening in the bottom thereof. The feed mechanism preferably includes two pairs of fingers movable in loop-like paths.

4 Claims, 3 Drawing Figures

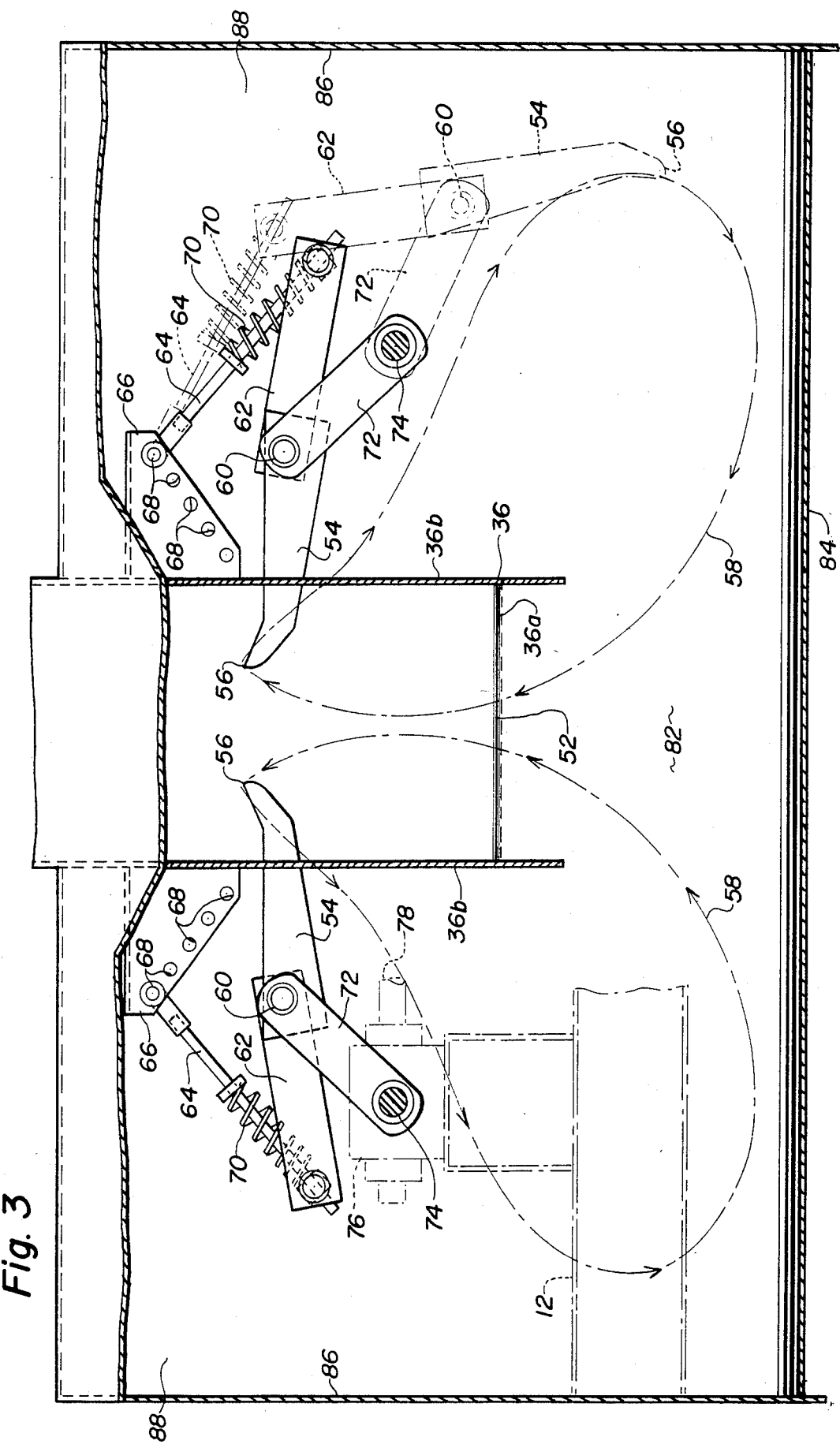

IN-LINE RECTANGULAR BALER

BACKGROUND AND SUMMARY OF THE INVENTION

A conventional type of baler for forming rectangular bales of crop material includes a pickup mechanism and a bale case arranged side-by-side. The pickup mechanism lifts crop material into a feed area located adjacent the bale case. A feed mechanism then moves the crop material laterally from the feed area through a feed opening in the side of the bale case. The overall width of this type of baler is a problem at certain times. It is also difficult at times to keep this type of baler properly aligned on windrows of crop material.

The present invention overcomes the above problems by providing a baler with a bale case disposed above and substantially centrally of a pickup mechanism. A feed mechanism moves crop material from a feed area located adjacent the bale case upwardly through a feed opening in the bottom of the bale case. The feed mechanism includes first finger means for moving crop material from one side of the feed area into the bale case and second finger means for moving crop material from the other side of the feed area into the bale case. In the preferred embodiment of the invention, the first and second finger means each comprise a pair of fingers movable in loop-like paths through the bale case.

DESCRIPTION OF THE DRAWINGS

FIG. 3 is a sectional view taken along line 3—3 of FIG. 1.

DESCRIPTION OF THE PREFERRED EMBODIMENT

Figure 1:
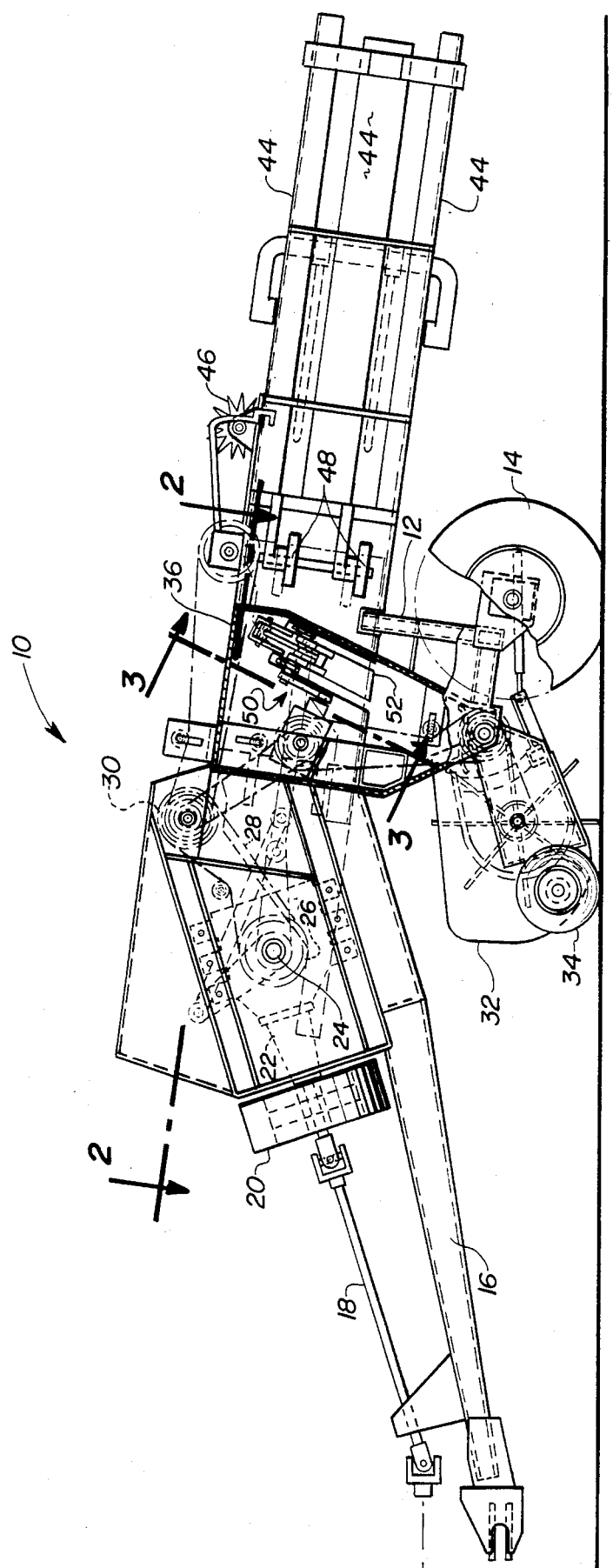
FIG. 1 is a side elevation view of a baler embodying the preferred embodiments of the present invention.
Figure 2:
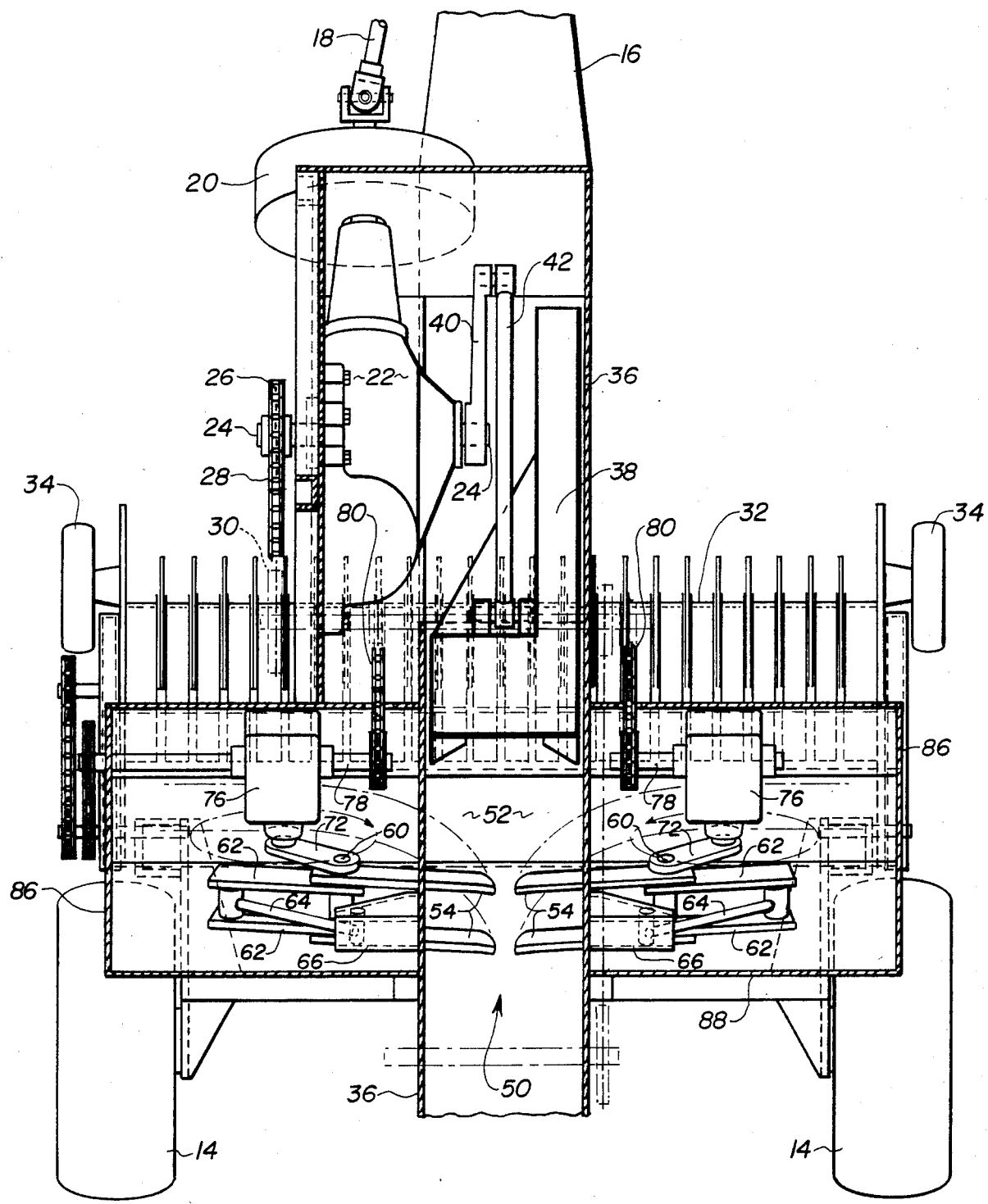
FIG. 2 is a sectional view taken along line 2—2 of FIG. 1.

Referring to FIGS. 1 and 2, a baler 10 includes a subframe 12 supported by a pair of wheels 14. A tongue 16 is provided on the baler 10 for connection to a tractor (not shown). A drive shaft 18 is adapted for connection to the tractor PTO in order to drive a flywheel 20 that is rotatably mounted on the baler 10. The drive shaft 18 is connected through a gear case 22 to a cross shaft 24 on which a sprocket 26 is fixed. Sprocket 26 is connected by a drive chain 28 to another sprocket 30.

A pickup mechanism 32 having rotatable fingers is mounted on the subframe 12 and is supported by wheels 34. A bale case 36 is supported on the subframe 12 above the pickup mechanism 32 and extends longitudinally of the baler 10. A plunger 38 is reciprocated within the bale case 36 to compact crop material delivered thereto into rectangular bales. The plunger 38 is connected to the cross shaft 24 by a crank arm 40 and a connecting rod 42. Tension rails 44 are attached to the outward end of the bale case 36 and are adjustable in known manner to vary bale density. A bale length indicator 46 is mounted on the bale case 36 and serves to operate knotter mechanisms 48 to tie twine around a bale of full length.

According to the present invention, the baler 10 includes a feed mechanism 50 for delivering crop material into the bale case 36 through a feed opening 52 in the bottom wall 36a thereof. As seen in FIGS. 2 and 3, the feed mechanism 50 comprises two pairs of fingers 54 which are movable in loop-like paths with their tips 56 following the paths 58 through the feed opening 52 in the bottom wall 36a of the bale case 36 and through slots, seen in FIG. 1, in the sidewalls 36b of the bale case 36. This movement of the fingers 54 is, of course, in timed relationship with the reciprocation of the plunger 38 so that there is no interference therebetween.

The pairs of fingers 54 are mounted on shafts 60. Pairs of link members 62 are also mounted on the shafts 60. Rod members 64 are pivotally connected at one end to the link members 62 and at the other end to brackets 66 that are fastened to the bale case 36. The brackets 66 have a series of holes 68, as shown in FIG. 3, for attaching the ends of the rod members 64 thereto to adjust the vertical penetration of the fingers 54 in the bale case 36. The rod member ends are shown in the bracket holes 68 in FIG. 3 that provide the deepest vertical penetration of the fingers 54 into the bale case 36. Springs 70 are disposed on the rod members 64 to allow yielding action of the fingers 54 in known manner in the event they become overloaded during baling.

Crank arms 72 have one end pivotally mounted on the shafts 60 and another end fixed on shafts 74 which extend from gear boxes 76 supported on the baler subframe 12. Shafts 78 shown in FIG. 2 extend from the gear boxes 76 and are driven by the sprocket 30 through an arrangement of sprockets and chains 80. Such driving of the shafts 78 results in rotation of the crank arms 72 thereby causing movement of the fingers 54 along the paths 58.

In the baling operation, the pickup mechanism 32 lifts crop material into a feed area 82 defined by a bottom panel 84, side panels 86 and a back panel 88 which together partially enclose the feed mechanism 50. The fingers 54 engage the crop material in the feed area 82 moving it toward and upwardly into the bale case 36 through the feed opening 52 in the bottom wall 36a of the bale case 36.

As shown in FIG. 1, the fingers 54 are inclined at an angle with respect to the bale case bottom wall 36a. Alternatively, however, the fingers 54 could be positioned so that they are perpendicular to the bale case bottom wall 36a.

The following claims are intended to cover all modifications and variations of the preferred embodiment of the present invention without departing from the spirit and scope of the invention.

Having thus described the invention, what is claimed is:

1. A baler comprising:
   (a) a subframe;
   (b) pickup means supported on said subframe;
   (c) a bale case supported on said subframe above and substantially centrally of said pickup means, said bale case having a bottom wall with a feed opening formed therein and side walls;
   (d) a plunger reciprocably disposed in said base case for movement back and forth across said feed opening;
   (e) a feed case located adjacent to said bale case and being substantially wider than said bale case, said pickup means disposed for delivering crop material to said feed area;
   (f) feed means for moving crop material from said feed area upwardly into said bale case through said feed opening;
   (g) said feed means including first finger means for moving crop material from one side of said feed area into said bale case and second finger means for moving crop material from the other side of said feed area into said bale case, (h) said first and second finger means each comprising a pair of fingers, mounted on a shaft, and movable in non-circular loop-like paths through said bale case in timed relationship with the movement of said plunger, the fingers of each said pair of fingers being inclined at an angle with respect to said bottom wall of said bale case; and (i) said feed area being defined by a bottom panel, side panels, and a back panel, said bottom panel lying below said bottom wall of said bale case, said side panels lying substantially parallel to and outwardly from said side walls of said bale case, said back panel extending upwardly from said bottom panel past said bottom wall of said bale case, and said back panel extending transversely between said side panels.

2. The baler of claim 1, further comprising means for adjusting the depth of vertical penetration of the fingers of each said pair of fingers into said bale case.

3. The baler of claim 1, wherein said first and second finger means each further comprise a crank arm pivotally mounted on said shaft, and means for rotating each said crank arm in order to cause movement of each said pair of fingers in one of said non-circular loop-like paths.

4. The baler of claim 2, wherein said means for adjusting comprises a link member connected to each said pair of fingers, a rod member pivotally connected at one end to said link member and at the other end to said subframe, said other end of each said rod member being attachable to said subframe at a plurality of locations.

* * * * *

UNITED STATES PATENT OFFICE
CERTIFICATE OF CORRECTION

Patent No. 4,514,968      Dated May 7, 1985

Inventor(s) Kenneth R. Underhill

It is certified that error appears in the above-identified patent and that said Letters Patent are hereby corrected as shown below:

Column 2, line 60, "case" first occurrence should be --area--.

Signed and Sealed this

Third Day of September 1985

[SEAL]

*Attest:*

DONALD J. QUIGG

*Attesting Officer*     *Acting Commissioner of Patents and Trademarks - Designate*